3,170,815
REMOVAL OF CALCIUM SULFATE DEPOSITS
William S. White, Midland County, Tex., assignor to The Dow Chemical Company, Midland, Mich., a corporation of Delaware
No Drawing. Filed Aug. 10, 1961, Ser. No. 130,464
7 Claims. (Cl. 134—27)

This invention relates to the removal of calcium sulfate deposits, particularly from oil and gas wells and associated subsurface and surface equipment. It also relates to the removal of such deposits from the surfaces of industrial equipment such as boilers, cooling towers, pipe lines, and similar units wherein water is utilized.

In oil and gas wells objectionable calcium sulfate deposits, in the form of gypsum, accumulate in the pores and channels of the fluid producing strata and in the well bore equipment such as the tubing, screens or strainer, chokes and pumps. The gypsum deposits also occur in oil field surface equipment including flow lines, separators, and emulsion treaters. The deposits are crystalline masses which adhere tightly to the formations and equipment and as the masses build up fluid flow is hindered and finally stopped.

Gypsum desposits form in wells often because of the intermixing of two produced brines, one high in calcium ions and the other high in sulfate ions, whereby the solubility of calcium sulfate is exceeded. The deposits also form because of the effect of temperature and pressure changes within a well, and the related surface equipment, upon a formation brine carrying dissolved calcium sulfate as it flows up the well or as it is processed by surface equipment after reaching the ground level.

In the past remedial actions have included treatment of plugged well formations with hydrochloric acid, or by fracturing, in order to re-establish passageways through the deposits. However, acidizing is not a successful remedial treatment because of the low solubility of calcium sulfate in the acid. Likewise, the benefits of fracturing treatments upon gypsum deposits are short-lived because fracturing does not affect the primary pores, nor unplug the channels and cracks. As to the well bore tubing and pump equipment, it may be cleaned by pulling from the well and mechanically chipping away the deposits and similar stringent remedial activities can be employed to remove the deposits from surface equipment but this method of combating the deposits leaves much to be desired. Mechanical cleaning is time and labor consuming and is not an answer where the deposits are confined and cannot be reached.

In industrial equipment, calcium sulfate deposits form particularly upon heat exchange surfaces such as those of steam generators or boilers, evaporators, concentrators, and the associated piping. Calcium sulfate deposits in such equipment impairs the heat transfer efficiency because the scale is a poor conductor of heat and because fluid circulation is hindered. Thus, to maintain the efficiency of the equipment the deposits must be removed.

The calcium sulfate deposit formed in industrial equipment wherein the temperature is above about 146° F. is the compound anhydrite. This form of calcium sulfate is both hard and substantially insoluble in the chemical solvents heretofore found commercially practical for chemical cleaning of industrial equipment. Thus, mechanical and chemical removal of anhydrite deposits leaves much to be desired.

An object of this invention is to provide a method for chemically removing gypsum deposits especially those in earth formations and equipment in oil, gas, and water wells.

A related object is to provide a method of chemical removal of gypsum deposits from the surface equipment associated with the production of oil and gas.

Another object is to provide a method for the removal of calcium sulfate deposits, existing as anhydrite, from industrial power generating and heat exchange equipment such as steam generating equipment, evaporators, lines and the like.

The invention is predicated upon the discovery that by subjecting calcium sulfate deposits to the action of chilled concentrated solutions of sodium hydroxide the deposits are caused to disintegrate into a soft sludge which may be flushed from the well or equipment. It is believed that the chemical reaction which causes the disintegration of the deposit is a double decomposition reaction between calcium sulfate and sodium hydroxide to form insoluble calcium hydroxide and sodium sulfate. The resulting calcium hydroxide is set free of the sulfate deposit and precipitates as a soft sludge. The sludge is readily removed from the area being treated in a number of ways. In some instances, the sludge will all be removed as the sodium hydroxide treating solution is removed. When some remains after removal of the sodium hydroxide, the residue can be washed out by flushing with water or dissolved by treatment with acid such as dilute hydrochloric or acetic acid.

The sodium hydroxide solution used for the treatment is chilled to a temperature of about 50–70° F. when treating gypsum, $CaSC_4 \cdot 2H_2O$, deposits. It is used at a strength of about 20–40% by weight for a contact time of less than an hour up to a matter of ten hours more or less. The contact time depends upon the thickness of the deposit to be removed and upon the volume of sodium hydroxide solution which can be used in relation to the amount of deposit to be dissolved. If the volume of the unit being treated is large in relation to the quantity of deposit to be removed it oftentimes is wise to use a solution in the medium or low range of concentration to gain a saving in material at the expense of a longer treating time. If an insufficient volume of solution to completely disintegrate the deposit can be applied to the deposit at one time, the treatment is carried out in two or more stages by draining off the sodium hydroxide solution when it spends to a concentration of 20% more or less of NaOH, and replacing it with fresh. If sufficient solution to disintegrate the entire deposit can be applied to the deposit in a single stage, the treatment is continued for a sufficient time to allow penetration of the solution through the entire deposit. Usually one to five hours is a satisfactory treating time, but the treatment can be continued for 10 hours or longer if required with no undesirable effects being encountered. A preferable concentration of sodium hydroxide treating solution is about 35 to 40% by weight at the start of the reaction, with the concentration dropping as the reaction proceeds, at a treating temperature of about 65° F.

The data in the following table characterizes the reaction between sodium hydroxide solutions and a gypsum deposit at temperatures between 40 and 80° F. The data are from tests using gypsum taken from the tubing of an oil well. For each test, a single dry chunk of the deposit was weighed and immersed in the sodium hydroxide solution under the conditions of the test. At the end of the exposure, any remainder of the gypsum chunk was rinsed with water, dried and reweighed. From this information, values were calculated for the time in hours for a gram of the gypsum deposit to be disintegrated by the particular concentration of sodium hydroxide solution shown in the table.

TABLE I

*Hours required for disintegration of one gram gypsum*

| Temperature, °F. | 20% NaOH | 29% NaOH |
|---|---|---|
| 40 | 16.4 | 11.7 |
| 50 | 13.9 | 5.0 |
| 60 | 13.3 | 4.4 |
| 70 | 7.8 | 7.5 |
| 80 | >21 | |

Deposits of calcium sulfate in the form of anhydrite, $CaSO_4$, are also susceptible to treatment with chilled sodium hydroxide solution in accordance with the invention. When compared to the removal of gypsum deposits, the concentration of sodium hydroxide which is used is lower, the temperature is lower, and the time is longer. A concentration of about 15% by weight is preferable but solutions of about 10–20% by weight serve satisfactorily. A treatment time on the order of one-half to five days is required to obtain disintegration of the anhydrite inasmuch as the reaction between the sodium hydroxide and anhydrite is much slower than that with gypsum. About 30–50° F. is an operable temperature range, while about 40° F. is a preferred temperature for the sodium hydroxide solution.

The following treatment for removing gypsum deposits from a West Texas oil well producing from a formation at depth 6550 to 6680 feet is illustrative of the practice of the invention. In this well, casing had been set in place down to 6550 feet and the well was produced from the open hole below the casing. When new and in good condition, the well had produced copious amounts of oil, but the production had declined to three barrels of oil and three barrels of water per day on the pump at the time treatment was begun. Before treatment, the pump was removed from the bottom of the well and examined, it was found to be coated with a deposit of gypsum. From this evidence, it was concluded that the face of the formation within the open hole and the passageways leading from the open hole back into the earth were likewise coated.

In preparation for the treatment, the well was cooled prior to introducing the caustic solution by the use of a chilled sodium chloride brine. About 10,900 gallons of the brine were chilled, by adding ice, to a temperature of 18° F. This brine was introduced into the well by pumping through tubing which was installed in the well to a depth of 6665 feet. As the chilled brine flowed from the tubing, it passed into the open hole section and thence into the producing formation. Pumping of the brine was completed in a period of 55 minutes.

The brine was followed by 990 gallons of 29% aqueous sodium hydroxide solution which had been chilled to 55° F. This was pumped rapidly to the lower end of the tubing, and then ejected from the tubing during the next one hour and twenty minutes. Thus, the chilled sodium hydroxide solution flowed slowly through the open hole section of the well bore and into the producing formation.

Following the injection of the sodium hydroxide solution the well was returned to production by pumping. It was found that the well now produced 40 barrels of oil and 10 barrels of water per day.

As a further example, the production from a well in Indiana had substantially decreased because of a gypsum deposit within the open hole of the pay formation and extending up the interior of the casing of the well. Twenty-three hundred gallons of 25% aqueous sodium hydroxide solution were chilled to 23° F. and circulated in the well for a period of two hours. The well was equipped with tubing and the circulation was carried out by pumping the chilled caustic down the tubing from whence it flowed across the face of the pay formation of the open hole, thence back to the surface of the earth via the annular space between the tubing and the casing and finally back to the intake of the pump. A test of the well following this treatment showed that production was increased by 20%.

In another example, a treatment was made on a well in Illinois. This treatment was carried out using about 500 gallons of 25% aqueous sodium hydroxide solution chilled to 47° F. The well had a normal bottom hole temperature of about 80° F. with the result that the chilled solution reduced the bottom hole temperature during the treatment to about 65–70° F. The well had been completed with casing set through a producing formation having a thickness of 10 feet, and communication with this formation accomplished by perforating the casing with four shots per foot. Tubing had been run into the well with the lower end extending to opposite the level of the perforations. The treatment was conducted by pumping the sodium hydroxide solution into the well via the tubing. It was flushed down the tubing with water. When a sufficient volume of fluid had been pumped that the sodium hydroxide solution was expelled from the tubing and had flooded the casing, perforations and adjacent formation, the pumping operation was stopped in order to hold the solution in this area about ½ hour. At the end of the one-half hour and again at the end of one hour, about 200 gallons additional water were pumped into the tubing in order to agitate the sodium hydroxide solution. Also, this additional water displaced the sodium hydroxide solution farther into the formation whereby it contacted more gypsum deposits. At the end of 1½ hours, 200 gallons of hydrochloric acid of about 15% strength and properly inhibited to prevent corrosion to the metal of the well and the pumping equipment, e.g., as in U.S. Patent 1,877,504 were pumped down the tubing and by displacing with water, forced into the formation. It was allowed to remain within the formation for 20 minutes after which pumping from the well was begun in order to remove the chemical solutions. Following this, the rate of production of oil was determined and found to be 7 barrels of oil per day. The well would produce three barrels of oil per day before the treatment.

In order that the treatment of a gypsum deposit with a sodium hydroxide solution can be carried out at the preferred temperature range of about 60° to 70° F., it is oftentimes necessary to prechill the deposit and the underlying formation or equipment base, as well as to use a chilled sodium hydroxide solution. The use of a chilled sodium hydroxide solution alone is satisfactory where the deposit and its supporting base are of such a temperature that the temperature resulting after the sodium hydroxide solution is brought into contact with the deposit and base will be in the operating range of the invention for a sufficient time for disintegration of the deposit. However, this procedure is limited by the freezing point of the sodium hydroxide solution, e.g., about 60° F. for a 40% solution, and −4° F. for a 15% solution; and if greater cooling is required this can be accomplished before encountering freezing of the sodium hydroxide solution by use of a chilled pretreating liquid.

Chilled water and brine solutions are satisfactory as pretreating liquids for cooling calcium sulfate deposits and the underlying base. The area to be chilled may be filled with the chilled liquid and allowed to soak, or the liquid may be circulated through the area in order to obtain better exchange of heat as well as to replenish the chilled liquid. Pulverized ice may be added to the water or brine to increase the cooling capacity.

Another manner of pre-cooling is the use of solid carbon dioxide. The solid carbon dioxide in the form of pellets or small chunks is preferably carried in a liquid of a low freezing point such as an alcohol or a petroleum oil such as kerosene or naphtha. The solid carbon dioxide is mixed with the liquid to form a slurry which is pumped or flowed into the well or the equipment being chilled. Solid carbon dioxide can also be introduced in water but the cooling effect is disadvantageously slowed by freezing of the water over the chunks of carbon dioxide.

Another method of introducing solid carbon dioxide into a well is by the use of a bailer. The bailer can be loaded with pellets or pulverized solid carbon dioxide, again preferably in a slurry of a low-freezing liquid, lowered into the well and dumped at the level where cooling is desired. Solid carbon dioxide in stick form can be used with a glass bottom bailer. In this operation, the bailer is lowered to the bottom of the well or to a stop within the bore which serves to break open the bottom of the bailer allowing the sticks of solid carbon dioxide to fall from the bailer.

In the treatment of well surface equipment which has become coated with a gypsum deposit, the desirable conditions of time, temperature, and strength of sodium hydroxide solutions to use in accordance with the invention are the same as for the removal of a gypsum deposit from within a well. Pre-cooling of the scale bearing unit usually requires the removal of less heat than is true for a well and oftentimes the sodium hydroxide solution can be chilled sufficiently to accomplish the cooling of the unit being treated. This is done by chilling the sodium hydroxide solution sufficiently that when the temperature of the solution and that of the unit becomes about equal, the temperature will be about 65° F. The treatment is also conveniently done during periods when the atmospheric temperature is about 65° F. and simply allowing the unit and the sodium hydroxide solution to reach this temperature for the treatment. Where chilling of the unit is a necessity, techniques similar to those used in wells as by using cold water or brine with or without slurried ice or solid carbon dioxide are satisfactory. The unit may be cooled to a point above 65° to 70° F. and finally cooled to this desirable temperature range by the introduction of a chilled sodium hydroxide solution to bring the unit and the solution to such a temperature range or both may be brought thereby to the desired temperature.

In instances where the sodium hydroxide solution or the gypsum deposit, or both, are at temperatures below the operating range, heating of the system by conventional means is carried out to bring the temperature up to the operating range. Heating of wells is not usually required as the earth temperature is above the preferred range at most well locations and depths.

Cooling techniques similar to those heretofore described are satisfactory for chilling sodium hydroxide solutions for the removal of anhydrite deposits from industrial equipment. Carrying out the treatment during a period of weather when the atmospheric temperature is about 40° F. or at least in the range of 30–50° F. is particularly beneficial in the instances of treating anhydrite deposits since oftentimes the deposits are in vessels of large capacity wherein chilling continuously for the treating period of up to five days or more otherwise may become burdensome.

When the treatment is not made during optimum atmospheric temperature conditions, the sodium hydroxide solution can be satisfactorily cooled if the solution temperature is above about 50° F., by circulating through refrigeration equipment. Similarly, if the solution temperature is below about 30° F., heating of the caustic solution becomes a requirement. This can be done by conventional means for heating chemical solutions, such as by the use of an immersion heater, heat exchanger or other means.

During well treatments, the sodium hydroxide solution is usually followed into the well with a displacement liquid in order to positively control the location of the solution. The composition of the displacement liquid is not critical and water, brine, or petroleum oil can be used satisfactorily. In the use of oil, a light fraction is preferable inasmuch as heavier fractions become more viscous at the temperatures of the treatment and thus are less readily pumped.

When hydrochloric or other acid is used to dissolve the sludge formed by the action of the sodium hydroxide solution upon calcium sulfate the maximum amount of acid ordinarily beneficial is that amount which is stoichiometrically equivalent to the amount of sodium hydroxide used. Usually less than this amount will suffice to remove the sludge produced by the sodium hydroxide solution from the treated area, inasmuch as some will be carried out mechanically by the sodium hydroxide solution and the acid solution. The use of more than the equivalent amount is not harmful and may be beneficial by removal of extraneous acid soluble materials which may be present in conjunction with the calcium sulfate.

I claim:

1. A method of removing a gypsum deposit from a confined surface which comprises contacting said deposit with a chilled fluid thereby to cool the deposit, removing said chilled fluid from the so cooled deposit, contacting the cooled deposit with an aqueous solution containing between about 20 and 40% of sodium hydroxide by weight, said solution having a temperature such that said sodium hydroxide solution and said cooled deposit when in mutual contact reach a temperature between about 50° F. and 70° F., for sufficient time to convert the gypsum deposit to a sludge, removing the resulting spent sodium hydroxide solution from said confined surface, dissolving any sludge not removed during the removal of the sodium hydroxide solution by treatment with an acid solution, and removing the resulting spent acid solution from said confined surface.

2. The method of removing a gypsum deposit as in claim 1, in which the chilled fluid is water.

3. The method of removing a gypsum deposit as in claim 1, in which the chilled fluid is a brine solution.

4. The method of removing a gypsum deposit as in claim 1 in which the chilled fluid is a water slurry of ice.

5. The method according to claim 1 in which the chilled fluid is a slurry of particulated solid carbon dioxide in a low freezing point liquid.

6. The method according to claim 1 wherein the contact time between the deposit and the sodium hydroxide solution is one half to ten hours.

7. The method according to claim 1 wherein the sludge is washed from the confined surface by treatment with a hydrochloric acid solution.

References Cited by the Examiner

UNITED STATES PATENTS

| | | | |
|---|---|---|---|
| 1,049,054 | 12/12 | Coombs | 134—29 XR |
| 1,873,083 | 8/32 | Walker | 252—8.55 |
| 2,008,839 | 7/35 | Samson. | |
| 2,059,459 | 11/36 | Hund et al. | 166—38 |
| 2,140,183 | 12/38 | Bresler | 166—38 |
| 2,259,428 | 10/41 | Shelley | 166—39 |
| 2,386,605 | 10/45 | Harton | 252—8.55 |
| 2,438,682 | 3/48 | Roberts | 252—8.55 |
| 2,679,294 | 5/54 | Bond et al. | 252—8.55 |
| 2,787,326 | 4/57 | Hughes | 166—38 |
| 2,811,209 | 10/57 | Elkins. | |
| 2,884,349 | 4/59 | Axelrad. | |
| 3,032,446 | 5/62 | Schutz et al. | 134—41 |
| 3,070,164 | 12/62 | Gordon | 166—41 |
| 3,076,762 | 2/63 | Dill | 252—8.55 |

OTHER REFERENCES

"Brine Baths for Dirty Wells," by F. R. Cozzens, The Oil Weekly, April 16, 1945 (pages 54–56).

DONALL H. SYLVESTER, *Primary Examiner.*

SIDNEY JAMES, CHARLES A. WILMUTH, MORRIS O. WOLK, *Examiners.*